Patented Apr. 6, 1948

2,439,108

UNITED STATES PATENT OFFICE 2,439,108

COATING WITH POLYVINYL ALCOHOL

Henry C. Staehle, Rochester, N. Y., assignor to Eastman Kodak Company, Rochester, N. Y., a corporation of New Jersey No Drawing. Application September 11, 1943, Serial No. 502,044

6 Claims. (Cl. 117—62)

1

The present invention relates to a method of coating with polyvinyl alcohol in which a boron compound is incorporated in the coating composition and the coating resulting therefrom is fumed with a volatile base such as ammonia.

Polyvinyl alcohol has been suggested for many and various uses as that material is of interest because of its water-solubility characteristics. It has been recognized in the art that it is a distinct advantage in the making of polyvinyl alcohol products to be able to set polyvinyl alcohol, used in making those products, rapidly at the desired time. Various methods have been suggested for accomplishing this setting or semisolidifying of the polyvinyl alcohol in aqueous solution after it has been formed or placed where it was to be used.

In order to thus hold the polyvinyl alcohol and aqueous solution to the desired form, gelling agents have been previously suggested. Those gelling agents which have been mentioned up to now have had the effect of converting the polyvinyl alcohol in aqueous solution into a thermo-reversible gel. In order to use compositions of this nature, it has been necessary to warm up the coating composition to impart fluidity thereto and, after coating out the composition upon a surface, the coating has been chilled for the purpose of gelling or setting it. These previous gelling or setting agents, although found to be useful in certain connections, have not gone into extensive use due to the limitations of one sort or another met with in coating compositions depending upon those prior art jelling agents to accomplish the setting of the aqueous polyvinyl alcohol. One of the disadvantages of the polyvinyl alcohol coating compositions containing a gelling agent as suggested by the prior art is that it does not set as rapidly as gelatin upon chilling. Therefore, there is more danger of distortion and flow than in cases where gelatin is employed for this purpose. Another disadvantage of prior polyvinyl alcohol coating compositions is that the gelling agent therein has been found to lose its effectiveness in the presence of gelatin or other colloidal material. In working with photographic emulsions, it is difficult to gell the polyvinyl alcohol which is employed as the protective colloid when gelatin has been added thereto. Another disadvantage of the prior attempts to set coatings of emulsions which employ polyvinyl alcohol as the carrier for the silver halide is that low viscosity polyvinyl alcohols employed in this connection give weak gels.

2

One object of my invention is to provide a polyvinyl alcohol coating solution which may be quickly set upon coating the composition onto a surface merely by fuming with a gaseous basic material. Another object of the invention is to provide a method of coating materials with polyvinyl alcohol in which warming of the coating composition is unnecessary and yet setting thereof is obtained. A further object of my invention is to provide a method of setting or gelling coating compositions which will allow the toleration of gelation in those compositions without any detrimental effect to the setting properties thereof. A still further object of the invention is to provide a method of setting polyvinyl alcohol compositions which is effective not only with compositions made using high viscosity polyvinyl alcohols but also compositions in which low viscosity polyvinyl alcohol is employed in whole or in part.

I have found that by incorporating a boron compound in an aqueous solution of polyvinyl alcohol at a pH of not more than 6 that a composition is obtained which may be coated out onto a surface and by fuming the coating with a volatile basic material such as ammonia, methylamine or ethylamine the coating is almost immediately set and, therefore, there is no distortion or slipping away of the coating obtained. After the polyvinyl alcohol coating has been set, it may be easily cured by drying thus leaving a coating of substantial permanence and evenness thereon. My invention is characterized by the setting of polyvinyl alcohol coating compositions in which boron is present, which compositions, after being coated out, are fumed with ammonia or some other gaseous base. Upon drying of the coating, the excess ammonia is driven off so that a firm transparent coating is obtained.

My invention contemplates the use of boron compounds generally for this hardening operation. Some of the boron compounds which have been found to be suitable are borax, sodium metaborate, sodium perborate, boric acid, or in fact, any water-soluble boron compound. It is an essential feature of my invention that the boron compounds are incorporated in the polyvinyl alcohol solution at an acid pH such as obtained by the use of a slight excess of acetic acid. After the boron compound has been incorporated in the coating composition, it may be coated out onto a smooth surface such as paper, metal, glass, Celluloid, cellulose acetate sheeting or the like and immediate setting is obtained by the fuming operation without the necessity of any change in temperature. The polyvinyl alcohol sets into a rigid, non-tacky, clear gel which can be dried in any position, the coating drying down to a clear, transparent, tough film.

The proportion of boron compound which is necessary to impart setting characteristics to the polyvinyl alcohol solution is rather small. Proportions of 1% or even less of boron compound based on the weight of polyvinyl alcohol have been found to be suitable. I have found that proportions of boron compounds within the range of 1 to 6%, based on the weight of the polyvinyl alcohol have exhibited satisfactory properties and ordinarily the amount of boron compound added will be within this range. My invention, however, is only limited to an amount of boron compound which will give a setting effect when a coating thereof is fumed with ammonia vapors. If desired, larger quantities of boron compounds than those specified may be employed but ordinarily the use of too great an amount of boron compound with the polyvinyl alcohol is not preferred because of the formation of a thermoreversible gel thereby. This necessitates warming of the polyvinyl alcohol coating composition, in use, which is not necessary where the proportion of boron compound is restricted to that which will not have this effect upon the polyvinyl alcohol. I have noted that the addition of the boron compound does increase the viscosity of the polyvinyl alcohol solution some but if the proportion of boron compound used is kept to a minimum, this increase in viscosity is of little influence on the process. My invention, however, contemplates both the use of proportions of boron compound which will not appreciably affect the viscosity of the polyvinyl alcohol and also higher proportions which do exhibit that effect. The pH of the resulting polyvinyl alcohol coating composition should be on the acid side and should preferably be 6 or less. If the pH is not kept down, an undesirable viscosity increase will be obtained which interferes with coating operations.

The setting effect, in accordance with my invention, is accomplished by fuming the coating obtained with a volatile organic base. The most commonly known compounds characterized by this designation are ammonia, methylamine and ethylamine and any one of these materials would be suitable in that connection. The setting action is most effective when the coatings or layers resulting from the coating composition are thin, preferably less than .005″ in thickness. For instance, if a coating of .001″ is applied to a surface the setting of the coating takes place almost immediately upon fuming with the volatile base or ammonia. My invention is also applicable when thicker coatings or layers are applied. However, a little more time is necessary to assure even distribution of the ammonia or base into the coating layer thus resulting in setting. In ordinary manufacturing operations where speedy coating is desirable, it would be preferable to apply the polyvinyl alcohol coating composition as a rather thin layer.

The following example is illustrative of my invention:

A polyvinyl alcohol coating composition was prepared by adding to 100 cc. of a 10% aqueous solution of polyvinyl alcohol having a viscosity of 60 seconds, one cc. of a 4% solution of borax which has been just acidified with acetic acid. Before addition of the acidified borax the polyvinyl alcohol solution was also acidified with acetic acid so as to be just acid to litmus. The resulting composition was of slightly higher viscosity than before the addition of the borax but it was sufficiently fluid to be readily suitable for coating. The composition was thinly coated on a glass surface and the layer was then subjected to the action of ammonia vapor. The coating liquid immediately set and was then dried by treatment with a current of warm dry air. A clear transparent coat of polyvinyl alcohol was obtained.

My invention contemplates the use of polyvinyl alcohols of various viscosities as the setting effect is useful on low viscosity polyvinyl alcohols as well as those of high viscosity. Where low viscosity polyvinyl alcohols are employed, the concentration may be less or it may be greater than in cases where the higher viscosity polyvinyl alcohols are employed. If desired, other agents, such as gelatin, may be mixed with the polyvinyl alcohol as the gelatin has little, if any effect upon the setting action of the borax-ammonia treatment.

Coatings in accordance with my invention may be employed for various purposes where a thin transparent layer is desired. For instance, polyvinyl alcohol is suitable for use in light filters but up to now the difficulties involved in the manufacture have precluded its use therefor. Also other instances where a very thin transparent coating would be desirable would fit in with my invention.

My invention contemplates not only the use of polyvinyl alcohol but also the use of hydrolyzed polyvinyl esters in which the major portion is polyvinyl alcohol. The description herein of the use of polyvinyl alcohol is to be understood as applicable to both partially hydrolyzed polyvinyl esters, the major portion of which is polyvinyl alcohol, and to the substantially completely hydrolyzed polyvinyl esters.

I claim:

1. A method of applying a coating of a polyvinyl ester, which has been hydrolyzed until a large portion thereof is polyvinyl alcohol, to the surface of a sheet which comprises forming a composition by dissolving in an aqueous solution thereof 1–6% of a water-soluble boron compound selected from the group consisting of the alkali metal borates and boric acid, coating out the composition thus formed at a pH of not more than 6 in a layer having a thickness less than .005 inch upon the sheet, fuming the coating with ammonia gas and drying the coating thus obtained.

2. A method of applying coatings which comprises dissolving in an aqueous solution of a polyvinyl compound selected from the group consisting of the partially hydrolyzed polyvinyl esters, the major portion of which is polyvinyl alcohol, and polyvinyl alcohol, approximately 1–6%, based on the weight of the polyvinyl compound, of a water-soluble boron compound selected from the group consisting of the alkali metal borates and boric acid, coating out the composition thus formed at a pH of not more than 6 in a layer having a thickness of less than .005 inch, fuming the coating with a nitrogen base selected from the group consisting of ammonia, methylamine and ethylamine gas, and drying the coating thus obtained.

3. A method of applying polyvinyl alcohol coatings upon the surface of a sheet which comprises dissolving approximately 1–6%, based on the weight of the polyvinyl alcohol, of a water-soluble boron compound selected from the group consisting of the alkali metal borates and boric acid in an aqueous solution of polyvinyl alcohol, coating out the composition thus formed at a pH of not more than 6 in a layer having a thickness of less than .005 inch upon the sheeting, fuming the coating with a volatile base selected from the group consisting of ammonia, methylamine and ethylamine gas, and drying the coating thus obtained.

4. A method of applying a polyvinyl alcohol coating to the surface of sheeting which comprises applying an aqueous solution of polyvinyl alcohol, approximately 1-6%, based on the weight of the polyvinyl alcohol, of borax and sufficient acetic acid to assure a pH of not more than 6, to form a layer having a thickness less than .005 inch, fuming the coating with ammonia gas and drying.

5. A method of applying a polyvinyl alcohol coating to the surface of sheeting which comprises dissolving approximately 1-6%, based on the weight of the polyvinyl alcohol, of boric acid in an aqueous solution of polyvinyl alcohol, coating out the composition thus formed at a pH of not more than 6 in a layer having a thickness less than .005 inch upon the surface of the sheeting, fuming the coating with ammonia gas and drying the coating thus obtained.

6. A method of applying a polyvinyl alcohol coating to glass which comprises dissolving in an aqueous solution of polyvinyl alcohol, approximately 1-6%, based on the weight of the polyvinyl alcohol, of a water-soluble boron compound selected from the group consisting of the alkali metal borates and boric acid coating out the composition thus formed at a pH of not more than 6 on the surface of the glass in a layer having a thickness less than .005 inch, fuming the coating with ammonia gas and drying.

HENRY C. STAEHLE.

REFERENCES CITED

The following references are of record in the file of this patent:

UNITED STATES PATENTS

| Number | Name | Date |
|---|---|---|
| 1,920,564 | Jochum | Aug. 1, 1933 |
| 1,998,544 | Jochum et al. | Apr. 23, 1935 |
| 2,251,296 | Shipp | Aug. 5, 1941 |
| 2,278,902 | Spanagel | Apr. 7, 1942 |
| 2,300,074 | Strain | Oct. 27, 1942 |
| 2,324,601 | Spanagel | July 20, 1943 |
| 2,330,314 | Schwartz | Sept. 28, 1943 |

FOREIGN PATENTS

| Number | Country | Date |
|---|---|---|
| 399,905 | Great Britain | Oct. 19, 1933 |

OTHER REFERENCES

R. & H. Technical Bulletin, Polyvinyl Acetate, Mar. 1941.

Rubber Age, Nov. 1943, (page 133).